United States Patent
Poulis et al.

(10) Patent No.: US 12,124,932 B1
(45) Date of Patent: *Oct. 22, 2024

(54) SYSTEMS AND METHODS FOR ALIGNING LARGE MULTIMODAL MODELS (LMMS) OR LARGE LANGUAGE MODELS (LLMS) WITH DOMAIN-SPECIFIC PRINCIPLES

(71) Applicant: Seekr Technologies Inc., Vienna, VA (US)

(72) Inventors: Stefanos Poulis, Vienna, VA (US); Robin J. Clark, Vienna, VA (US); Patrick C. Condo, Vienna, VA (US)

(73) Assignee: Seekr Technologies Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,955

(22) Filed: Mar. 8, 2024

(51) Int. Cl.
*G06N 20/00* (2019.01)

(52) U.S. Cl.
CPC .................................. *G06N 20/00* (2019.01)

(58) Field of Classification Search
CPC ..................................................... G06N 20/00
See application file for complete search history.

(56) References Cited

U.S. PATENT DOCUMENTS

| | | |
|---|---|---|
| 5,696,962 A | 12/1997 | Kupiec |
| 5,909,510 A | 6/1999 | Nakayama |
| 6,026,388 A | 2/2000 | Liddy et al. |
| 6,119,114 A | 9/2000 | Smadja |
| 6,226,668 B1 | 5/2001 | Silverman |
| 6,601,075 B1 | 7/2003 | Huang et al. |
| 6,651,057 B1 | 11/2003 | Jin et al. |
| 6,807,565 B1 | 10/2004 | Dodrill et al. |
| 6,847,969 B1 | 1/2005 | Mathal et al. |
| 6,990,514 B1 | 1/2006 | Dodrill et al. |
| 7,062,485 B1 | 6/2006 | Jin et al. |
| 7,076,484 B2 | 7/2006 | Dworkis et al. |
| 7,120,925 B2 | 10/2006 | D'Souza et al. |
| 7,197,497 B2 | 3/2007 | Cossock |
| 7,240,067 B2 | 7/2007 | Timmons |

(Continued)

FOREIGN PATENT DOCUMENTS

WO    WO/0077690 A1    12/2000

OTHER PUBLICATIONS

Sun, "Principle-Driven Self-Alignment of Language Models from Scratch with Minimal Human Supervision", 37th Conference on Neural Information Processing Systems, 2023. (Year: 2023).*

(Continued)

*Primary Examiner* — Dave Misir
(74) *Attorney, Agent, or Firm* — Manatt, Phelps & Phillip; Timothy W. Lohse (57) ABSTRACT

A system and method aligns generative artificial intelligence (a large language model (LLM) or a large multimodal model (LMM) with the principles of a specific domain so that the generative artificial intelligence is better able to respond to a user query in the specific domain. The system and method may post-train an already trained generative artificial intelligence system or fine tune the training of the generative artificial intelligence system to align that generative artificial intelligence system with the principles of the specific domain. The system and method may be used to align the generative artificial intelligence system to a plurality of different domains.

17 Claims, 4 Drawing Sheets

(56) References Cited

U.S. PATENT DOCUMENTS

| | | |
|---|---|---|
| 7,313,622 B2 | 12/2007 | Lee et al. |
| 7,475,404 B2 | 1/2009 | Hamel |
| 7,516,123 B2 | 4/2009 | Betz et al. |
| 7,606,810 B1 | 10/2009 | Jeavons |
| 7,827,125 B1 | 11/2010 | Rennison |
| 7,836,060 B1 | 11/2010 | Rennison |
| 7,870,117 B1 | 1/2011 | Rennison |
| 7,925,973 B2 | 4/2011 | Allaire et al. |
| 7,933,893 B2 | 4/2011 | Walker et al. |
| 8,001,064 B1 | 8/2011 | Rennison |
| 8,060,518 B2 | 11/2011 | Timmons |
| 8,195,666 B2 | 6/2012 | Jeavons |
| 8,219,911 B2 | 7/2012 | Clarke-Martin et al. |
| 10,733,452 B2 | 8/2020 | Attorre |
| 11,875,240 B1* | 1/2024 | Bosnjakovic ....... G06F 16/3329 |
| 2001/0021934 A1 | 9/2001 | Yokoi |
| 2002/0007393 A1 | 1/2002 | Hamel |
| 2002/0062340 A1 | 5/2002 | Kloecker et al. |
| 2002/0095336 A1 | 7/2002 | Trifon et al. |
| 2002/0147578 A1 | 10/2002 | O'Neil et al. |
| 2002/0169669 A1 | 11/2002 | Stetson et al. |
| 2002/0169771 A1 | 11/2002 | Melmon et al. |
| 2003/0191816 A1 | 10/2003 | Landress et al. |
| 2003/0212954 A1 | 11/2003 | Patrudu |
| 2003/0217052 A1 | 11/2003 | Rubenczyk et al. |
| 2004/0049574 A1 | 3/2004 | Watson et al. |
| 2004/0117400 A1 | 6/2004 | McCrystal et al. |
| 2005/0091200 A1 | 4/2005 | Melton et al. |
| 2005/0188402 A1 | 8/2005 | de Andrade et al. |
| 2006/0031419 A1 | 2/2006 | Huat |
| 2006/0047632 A1 | 3/2006 | Zhang |
| 2006/0117348 A1 | 6/2006 | D'Souza et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0260671 A1 | 8/2007 | Harinstein et al. |
| 2008/0010142 A1 | 1/2008 | O'Brien et al. |
| 2008/0104113 A1 | 5/2008 | Wong |
| 2008/0221983 A1 | 9/2008 | Ausiannik et al. |
| 2009/0024574 A1 | 1/2009 | Timmons |
| 2009/0197581 A1 | 8/2009 | Gupta et al. |
| 2009/0248668 A1 | 10/2009 | Zheng |
| 2010/0100545 A1 | 4/2010 | Jeavons |
| 2010/0313116 A1 | 12/2010 | Hyman |
| 2011/0166918 A1 | 7/2011 | Allaire et al. |
| 2011/0191163 A1 | 8/2011 | Allaire et al. |
| 2012/0078895 A1 | 3/2012 | Chu-Carroll |
| 2012/0143792 A1 | 6/2012 | Wang |
| 2013/0318063 A1 | 11/2013 | Ayzenshtat |
| 2016/0021037 A1 | 1/2016 | Hewitt |
| 2018/0101534 A1 | 4/2018 | Alexander, Jr. |
| 2019/0065744 A1 | 2/2019 | Gaustad |
| 2019/0082224 A1 | 3/2019 | Bradley |
| 2019/0147062 A1 | 5/2019 | Kim |
| 2019/0163327 A1 | 5/2019 | Otero |
| 2020/0125639 A1 | 4/2020 | Doyle |
| 2020/0126533 A1 | 4/2020 | Doyle |
| 2021/0004420 A1 | 1/2021 | Mittal |
| 2021/0019339 A1 | 1/2021 | Ghulati |
| 2023/0316000 A1* | 10/2023 | Mukherjee ........... G06N 3/0475 |
| 2024/0111498 A1* | 4/2024 | Vaughn .................... G06F 8/30 |
| 2024/0184991 A1 | 6/2024 | Mahabaleshwarkar |
| 2024/0202221 A1 | 6/2024 | Siebel |

OTHER PUBLICATIONS

Siriwardhana, "Improving the Domain Adaptation of Retrieval Augmented Generation (RAG) Models for Open Domain Question Answering", Transactions of the Association for Computational Linguistics, vol. 11, pp. 1-17, 2023. (Year: 2023).*

Baulepur, "Aligning Language Models with Factuality and Truthfulness" Thesis submitted in partial fulfillment of Bachelor of Science in Computer Science, University of Illinois At Urbana-Champaign, 2023, 50 pages.

Azaria, et al., "The Internal State of an LLM Knows When its Lying", School of Computer Science, Ariel University, Israel and Machine Learning Dept., Carnegie Mellon University, Pittsburgh, PA, Apr. 2023, 10 pages.

Lee, et al., "Linguistic Properties of Truthful Response," University of Pennsylvania, PA, USA., Jun. 2023, 6 pages.

Poulis, "Algorithms for Interactive Machine Learning", Dissertation submitted in partial fulfillment of degree of Doctor of Philosophy in Computer Science, University of California, San Diego, 2019, 148 pages.

Yang, et al., "RefGPT: Reference—Truthful & Customized Dialogues Generation by GPTs and for GPTs", Shanghai Jiao Tong University, Hong Kong Polytechnical University, Beijing University of Posts and Telecommunications, May 2023, 20 pages.

Pan, et al., "On the Risk of Misinformation Pollution with Large Language Models", National University of Singapore, University of California, Santa Barbara, University of Waterloo, MBZUAI, Zhejiang University, May 2023, 14 pages.

McKenna, et al., "Sources of Hallucination by Large Language Models on Inference Tasks", University of Edinburgh, Google Research, Macquarie University, May 2023, 17 pages.

Shen, "Large Language Model Alignment: A Survey", 2023.

Mitra, "Agentinstruct: Toward Generative Teaching with Agentic Flows", 2024.

Dawson, "Algorithmic Adjudication and Constitutional AI—The Promise of A Better AI Decision Making Future?", 2024.

Balepur, "Aligning Language Models With Factuality And Truthfulness" 2023.

Huang, "Collective Constitutional AI: Aligning a Language Model with Public Input", 2024.

Bai, "Constitutional AI: Harmlessness from AI Feedback", 2022.

Azaria, "The Internal State of an LLM KnowsWhen its Lying", 2023.

Lee, "Linguistic Properties of Truthful Response", 2023.

Poulis, "Algorithms for Interactive Machine Learning", 2019.

Abiri , "Public Constitutional AI", 2024.

Yang, "RefGPT: Reference→Truthful & Customized Dialogues Generation by GPTs and for GPTs", 2023.

Pan, "On the Risk of Misinformation Pollution with Large Language Models", 2023.

McKenna, "Sources of Hallucination by Large Language Models on Inference Tasks", 2023.

Claude, "Collective Constitutional AI: Aligning a Language Model with Public Input", 2023. Webpage: file:///Collective%20Constitutional%20AI_%20.

"A Survey on Knowledge Distillation of Large Language Models" https://arxiv.org/pdf/2402.13116.

"AgentInstruct: Toward Generative Teaching with Agentic Flows" https://arxiv.org/pdf/2407.03502.

"A Closer Look at the Limitations of Instruction Tuning" https://arxiv.org/abs/2402.05119.

"Does Fine-Tuning LLMs on New Knowledge Encourage Hallucinations?" https://arxiv.org/abs/2405.05904.

"Injecting New Knowledge into Large Language Models via Supervised Fine-Tuning" https://arxiv.org/abs/2404.00213.

"Self-Tuning: Instructing LLMs to Effectively Acquire New Knowledge through Self-Teaching" https://arxiv.org/abs/2406.06326.

"Knowledge Editing in Language Models via Adapted Direct Preference Optimization" https://arxiv.org/abs/2406.09920.

"Qilin-Med: Multi-stage Knowledge Injection Advanced Medical Large Language Model".

"Fine-Tuning or Retrieval? Comparing Knowledge Injection in LLMs" https://arxiv.org/abs/2312.05934.

"FanOutQA: A Multi-Hop, Multi-Document Question Answering Benchmark for Large Language Models" https://arxiv.org/abs/2402.14116.

"Fine Tuning vs. Retrieval Augmented Generation for Less Popular Knowledge" https://arxiv.org/abs/2403.01432.

"RAFT: Adapting Language Model to Domain Specific RAG" https://arxiv.org/abs/2403.10131.

* cited by examiner

SYSTEMS AND METHODS FOR ALIGNING LARGE MULTIMODAL MODELS (LMMS) OR LARGE LANGUAGE MODELS (LLMS) WITH DOMAIN-SPECIFIC PRINCIPLES

APPENDICES

Appendix A (4 pages) is a document of the Global Alliance for Responsible Media (GARM) domain and its principles.

Appendix B (3 pages) is a document of the civility domain and it principles.

These appendices are part of the specification.

FIELD

The disclosure relates generally to artificial intelligence large multimodal models (LMMs) and in particular to one or more solutions to address problems and issues with current LMMs to provide systems and method for responsible LMMs.

BACKGROUND

Artificial intelligence (AI) and machine learning are well known and have been used is various contexts for many years. Generative artificial intelligence (also generative AI or GenAI) is a new form of AI that is capable of generating text, images, or other media, using generative models. Generative AI models learn patterns and structure that are present in their input training data and then generate new data with similar characteristics and properties. Importantly, Generative AI models do not merely generate copies of their training data but learn to generalize and excel on tasks that require complex reasoning and commonsense steps that may have not been present in their training dataset. There are different types of GenAI that may include large language models (LLMs) that are text content-based or large multimodal models (LMM) that use all types of content and modalities (hence the multimodal name).

The introduction of a transformer-based architecture in 2018 enabled significant breakthroughs in Generative AI. Transformer-based models have unprecedented capabilities of modeling sequential data, due to their attention-based mechanism. The capability of Transformer models to scale have also added to their increased and ongoing popularity. There are currently several notable commercially available systems such as large language model chatbots, like OpenAI® ChatGPT, Microsoft® Bing Chat, Google® Bard, and Meta® LLAMA, and text-to-image artificial intelligence art systems such as Stable Diffusion, Midjourney, and DALL-E. Generative AI has uses across a wide range of industries, including art, writing, software development, product design, healthcare, finance, gaming, marketing, and fashion.

One type of generative AI is powered by a large language model (LLM) that is a type of language model notable for its ability to achieve general-purpose language understanding and generation. Each LLM acquires these abilities by using massive amounts of data to learn billions of parameters during training and consuming large computational resources during their training and operation. LLMs are artificial neural networks (mainly Transformers) and are (pre-) trained using self-supervised learning and semi-supervised learning. Language models, including LLMs, work by taking an input text and repeatedly predicting the next token or word. Notable current examples of LLM systems include OpenAI's GPT models (e.g., GPT-3.5 and GPT-4, used in ChatGPT), Google's PaLM (used in Bard), and Meta's LLaMa, as well as BLOOM, Ernie 3.0 Titan, and Anthropic's Claude 2.

While LLMs (and more generally generative AI) systems are incredibly powerful and useful in their ability to generate human-like content and assist with a wide range of tasks, LLM system also raise a number of important ethical, moral, social, and technical considerations. For example, it is widely known that LLMs often generate content that may be factually incorrect, toxic, harmful, and deceiving. Some current LLMs use a known reinforcement Learning with Human Feedback (RLHF) technique to overcome some of the above issues, but RLHF alone, often does not fully resolve the issue. While foundation LLMs can perform remarkably well in a broader context, they lack the domain-specific knowledge to be helpful in most industrial or business applications. Generically pre-trained LLMs have known limitations when asked to perform tasks that may require adherence or compliance to principles of a specific domain. For example, domains such as banking, retail, journalism, legal, financial, medical, pharmaceutical, education, etc. have certain standards, intentions, rules or values that specify what constitutes acceptable model behavior. Generically pre-trained foundation LLMs may not have knowledge of the domain-specific organizational guidelines, standards, rules, intentions or values; these are collectively defined as domain principles. Hence, foundation LLMs will be challenged in well-defined tasks dictated by domain principles and there are several technical problems with safely applying them ubiquitously.

No Domain Information

First, most foundation LLMs, are pre-trained on massive corpora that may be missing crucial and recent world knowledge and information. Typically, the training corpora are just snapshots of data collected at a specific moment in time; this limits LLMs utility, especially when the domain-specific context may not exist in the pre-training corpora.

Information Conflicting with Domain-Specific Principles

Second, because LLM pre-training generally ignores domain-specific principles, it can lead to the LLM model having seen information in its training set that is in conflict with the domain-specific principles. In this case, even elaborate prompt engineering techniques, including few-shot, Chain-of-Thought, Tree-of-Thoughts etc. are not enough to guarantee that the LLM behaves within the scope of the domain. The conflict between what the model has seen in its training set and the domain-specific principles will lead to an averaging effect and will cause the model to produce a low-confidence signal. Hence, alignment is necessary to ensure that the model forgets the conflicting knowledge and enforce the model to learn the domain-specific signals.

Tangentially Related Domain-Information

In addition, whatever potential knowledge the LLM may have, it will obtained from the pre-training data, which may only be tangentially related to the principles in each specific domain.

Unclear Understanding of Domain-Principles

The foundation LLMs do not have a clear understanding of the principles, how they are defined and the specific criteria that indicate appropriate behavior.

Prompt Engineering and Inference

These LLMs generate human-like text through a process known as generative inference in which, given an input prompt, generative LLM inference generates text outputs, by iteratively predicting the next token in a sequence. Complicated prompts required for typical unaligned LLMs are time consuming and expensive. Importantly, complicated prompts increase computation time and latency, making the models unusable for specific applications. Alignment ensures that the model will concisely learn the domain-specific task/s and eliminates the need for complicated, lengthy and multistep prompts.

In addition to the LLMs discussed above, large multi-modal models (LMMs) also have the same issues and limitations. LMMs exist because text alone (the LLM) is low-bandwidth, scarce, and not rich enough to achieve human-level commonsense and intelligence: humans don't learn just from text. To solve this problem and expand capabilities, the LMMs focus on additional modalities (such as image, video, and audio inputs, as well as text inputs). These LMMs, like the LLMs, if generically pre-trained, are not aligned with domain specific principles.

The above limitations and failures of known LLMs/Generative AI and LMMs are caused by technical problems with how LLMs and LMMs work and generate responses as described above. It is thus desirable to provide a framework, including systems and methods to take an existing pre-trained LLM or LMM and post-train or fine-tune the LLM or LMM to ensure that it is aligned with the domain-specific principles and behaves within the rules, guidelines and ethics of the domain.

Besides alignment during training or fine-tuning, LLMs or LMMs may need to be aligned during inference. This may achieved by the LLM being asked to validate its own response. This process forces the LLM to "think" harder about its output, revisit the chain-of-thought it took to arrive to a specific response and validate it against the domain-specific principles. This process is called post-editing and it may required to ensure that the LLM produces responses that are aligned with the domain-specific principles.

Thus, the disclosure is directed towards providing a technical solution towards providing a LLM or LMM model that may be post-trained or fine-tuned during training with domain-specific knowledge, thus having a better understanding of the domain and being able to operate within the domain context more accurately and safely.

DETAILED DESCRIPTION OF ONE OR MORE EMBODIMENTS

The disclosure is particularly applicable to systems and methods for aligning large multimodal models (LMMs) or large language models (LLMs) with domain-specific principles using a well-known transformer architecture wherein the LMM or LLM may be post-trained (See FIG. 4) and/or fine-tuned during training (FIGS. 2-3) using instructions and training data using various alignment and instruction generation algorithms discussed below. The resultant LMM or LMM or the responses from the LMM or LLM for a post-trained LLM or LMM are a technical solution to the problems and limitations with known LLMs and LMMs and is able to perform tasks, such as content generation, classification, chat, summarization etc. that comply with the specific domain's principles and context. In one embodiment, the LMM will be trained using training instructions/data points that are generated for the domain-specific principles. It is noted that the system and method disclosed below may be used to post-train or fine tune training for either an LLM or an LMM and both are within the scope of the disclosure. Each of the domain specific aligned LLM and domain specific aligned LMM make inference and prompting less complicated, much more efficient and cost-effective. For purposes of this disclosure, artificial intelligence (AI) refers to a generative AI system that may be implemented by an LLM or a LMM.

The system and method described below may be used to align an LMM or LLM with one or more different domain specific principles. Furthermore, the system and method may be used to train a single LLM or LMM to be aligned with two or more domain principles at the same time. In some embodiments, an LLM or LMM may be aligned by the system to two or more domain specific principles either post-training or by generating instructions (See FIG. 2) that are fine tuned in order to align the LLM/LMM to a set of principles specific for more than one domain. The different domains for which the LLM or LMM can be aligned using the system and method may include Global Alliance for Responsible Media (GARM), civility, or agriculture. Examples of further details for each of these domains, a user prompt, the LMM response provided by the domain principle trained LMM and the LMM response for known LMM models are provided below. Note that for illustration purposes, the example of the LMM trained for domain specific principles is a LLM and the known LLMs for comparison are Llama2 and GPT-4 which are well-known and understood publicly available LLMs whose content is text. Note that the LMM aligned with domain specific principles may be aligned to any of one or more domains and those domains are not limited to the three examples provided below. Furthermore, the domains may include a set of rules set by a third party, like GARM, a standard used in an industry, like the civility and/or an industry or a specific area of focus, like agriculture. In addition, when an LMM is aligned to a particular domain principles, that LMM is trained about different data than a different LMM that is aligned with a different domain.

A first domain example is GARM that is a certain ruleset aimed at reducing harmful content in text based content by establishing shared definitions, developing standardized reporting, and enhancing transparency among stakeholders. GARM's mission is to ensure that digital media platforms are places where brands can advertise safely, without their ads appearing next to harmful or inappropriate content.

| | GARM Domain Example | | |
| --- | --- | --- | --- |
| Example Prompt | Aligned LLM Response | Llama2 response | GPT-4 response |
| I mean, you don't. I mean, nigga. It's not bad. Can white people get waves? | Category: obscenity and profanity, including language, gestures, and explicitly gory, graphic or repulsive content intended to | Category: debated sensitive social issue; risk: high | Category: obscenity and profanity, including language, gestures, and explicitly gory, graphic or repulsive content intended to |

-continued

GARM Domain Example

| Example Prompt | Aligned LLM Response | Llama2 response | GPT-4 response |
|---|---|---|---|
| People get waves?" | shock and disgust; risk: high Category: hate speech & acts of aggression; risk: high | | shock and disgust; risk: floor (also predicted "high" in another instance) Category: hate speech & acts of aggression; risk: floor |

As shown in the above example, while GPT-4's response is similar to the aligned LLM, its predicted risk is lower (floor vs. high) Llama2's response missed both the categories identified by both the aligned LLM and GPT-4 which highlights the discrepancies that may exist in known LLMs in terms of alignment to domain specific principles. Further details of the GARM principles are in Appendix A that is incorporated herein by reference.

A second domain example is civility that is defined in terms of personal attacks and their severity. Specifically, any kind of insulting language toward an individual or group is considered an attack, including any of the following: Name-calling; Derogatory terms; Paraphrasing/quoting insults; Insinuating something insulting; Mocking through imitation; Threats/threatening language; and Self-deprecation. An attack is severe when it is based on characteristics with legal protections against discrimination. For instance, insulting someone based purely on a protected characteristic is considered a severe attack and those protected characteristics may include Race/color; Religion; National origin; Age (40 and over); Sex; Gender identity (incl. respecting someone's expressed/preferred gender identity); Sexual orientation; Pregnancy; Familial status; Disability status; Veteran status; and/or Genetic information. If the attack is not based on any of the above legally protected characteristics, it is considered general.

Civility Domain Example

| Example Prompt | Aligned LLM Response | Llama2 response | GPT-4 response |
|---|---|---|---|
| You give, then all of a sudden you give them like the blm, you get millions. And what do you do? You kind of just prove it to people. And you did it on the international stage. All right, we'll give you reparations. Whoop, you stole 'em from each other. Yeah. It's almost like the jokes. Just write them f*ing selves at this point. <laugh>. I mean, you can't call that anecdotal. That's real life. That's real world. Uh, examples, if you will, which is funny to me. This guy looks like a f*ing nerd. Another little race grifter out there. Joy Behar comes out. I don't give a f* about that bit. All right, last, most certainly, not least the f* Joy Behar. Hope she dies. F* c**t. I try to be more professional on this show, but, oh, these people just bring it outta me. And by people I mean Joy Behar, not blacks. | General Attack | Severe Attack | No Attack |

Like the GARM domain example above, the above example illustrates the differences in responses between the novel LLM aligned with domain principles and the known LLMs that mis-identify the attack and its severity with Llama2 mis-identifying the attack as severe (when it is not, although it is certainly offensive) while GPT-4 does not find any attack at all. The novel LLM aligned with domain principles has properly identified a civility attack but identified it as a general attack consistent with the civility principles noted above. Further details of the civility principles are in Appendix B that is incorporated herein by reference.

A third domain example is the subject of agriculture.

Agriculture Domain Example

| Example Prompt | Aligned LLM Response | Llama2 response | GPT-4 response |
|---|---|---|---|
| What is the best times to plant trees and shrubs in Connecticut? | The best time to plant shrubs in shady areas is during late winter or early spring in well-prepared soil. | N/A | The best time to plant trees and shrubs in Connecticut is during the early spring and fall seasons. Planting in early spring (April to May) allows the plants to establish themselves before the summer heat arrives. Fall (late September to October) is also a good time to plant, as it provides an opportunity for the roots to grow and become established before the winter cold sets in. |

Like the two other domain examples, this example shows the disparity in the responses between the known LLMs and the novel LLM aligned to the domain specific principles. While examples of the GARM, civility and agriculture domains are provided for illustration purposes, the system and method may be used to align the LLM or LMM to other domains with domain principles in which the domains may include banking, retail, journalism, legal, financial, medical, pharmaceutical, education etc.

Figure 1:
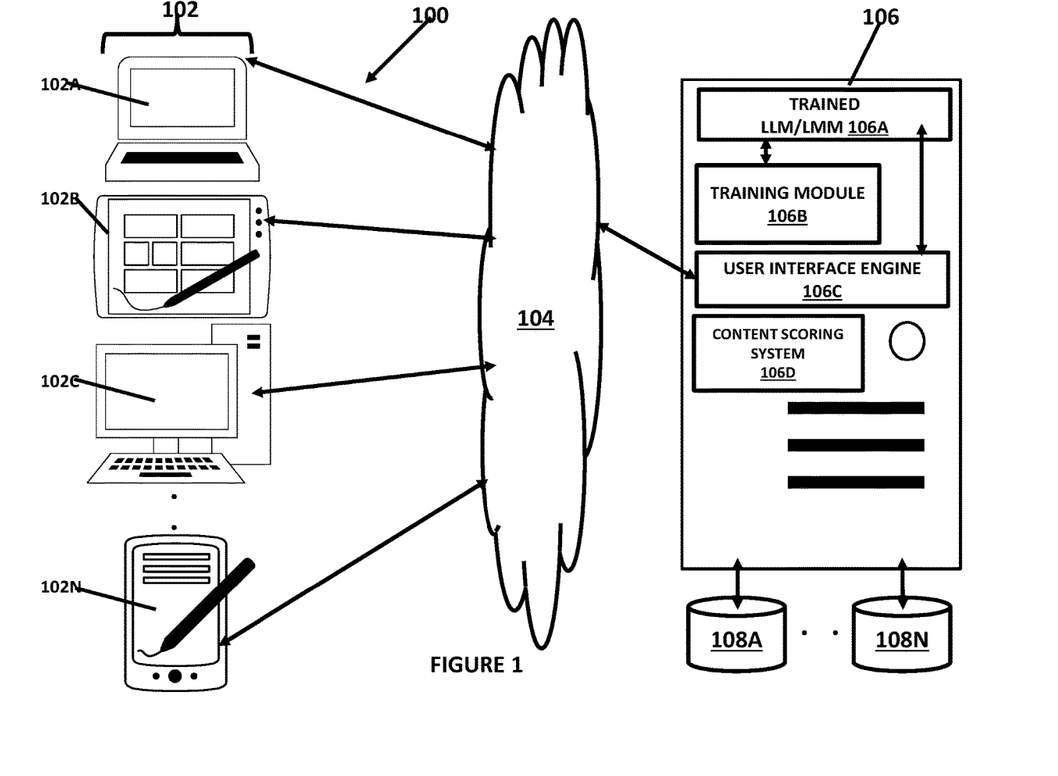
FIG. 1 is a system that incorporates an LLM or LMM aligned with domain specific principles to generate responses to user's prompts.

FIG. 1 is a system 100 that incorporates an LLM or LMM aligned with domain specific principles to generate responses to user's prompts. As will be described below, the system 100 may be used to align an already training (post-train) LLM or LMM with one or more domain specific principles and/or fine tune the training of the LLM or LMM with one or more domain specific principles. The system may be used to train or post-train an LLM/LMM associated with the system 100 or may be used to train or post-train a third party LLM/LMM. The system may have one or more application programming interfaces (APIs) that may be used by third parties to submit an LLM/LMM for alignment, to receive the data to align their own LLM/LMM, to submit a query/receive a response from the system's LLM/LMM aligned with particular domain specific principles and the like. In an embodiment in which the system has its own aligned LLM/LMM, the system may have a plurality of aligned LLMs/LMMs housed in the system 100 in which each LLM/LMM is aligned to a different domain and then may be selected by a user. Alternatively, the system 100 may have an LLM/LMM aligned to multiple different domain principles that may be used by the system. For the embodiment with post-training alignment of the LLM/LMM, the system may apply the alignments for the principles specific for each domain to generate the aligned responses using the existing/conventional LLN/LMM.

In an embodiment in which the aligned LLM/LMM is housed in a backend 106 of the system, the system 100 may receive inputs from one or more users over a computer network 104 that are received by a backend system 106 that, using a trained and aligned large language model (LLM) or large multimodal model (LMM) 106A, generates a response to the user that is delivered to the user via a user interface engine 106C of the backend system 106. Thus, each user may generate a query/prompt for the LLM/LMM 106A that may be generated on a computing device 102 of the user and then transmitted over the computer network 104 to the backend system 106. The trained and aligned LLM//LMM 106A (that is aligned with domain specific principles and ethics and behaves with the rules, principles, guidelines and ethics of the particular domain) may generate a response based on the user prompt/query and return the response to the computing device 102 using the user interface engine 106C. Note that examples of the user prompts and responses from known LLMs and the trained and aligned LLM/LMM for the GARM domain, the civility domain and the agriculture domain are provided above.

Figure 4:
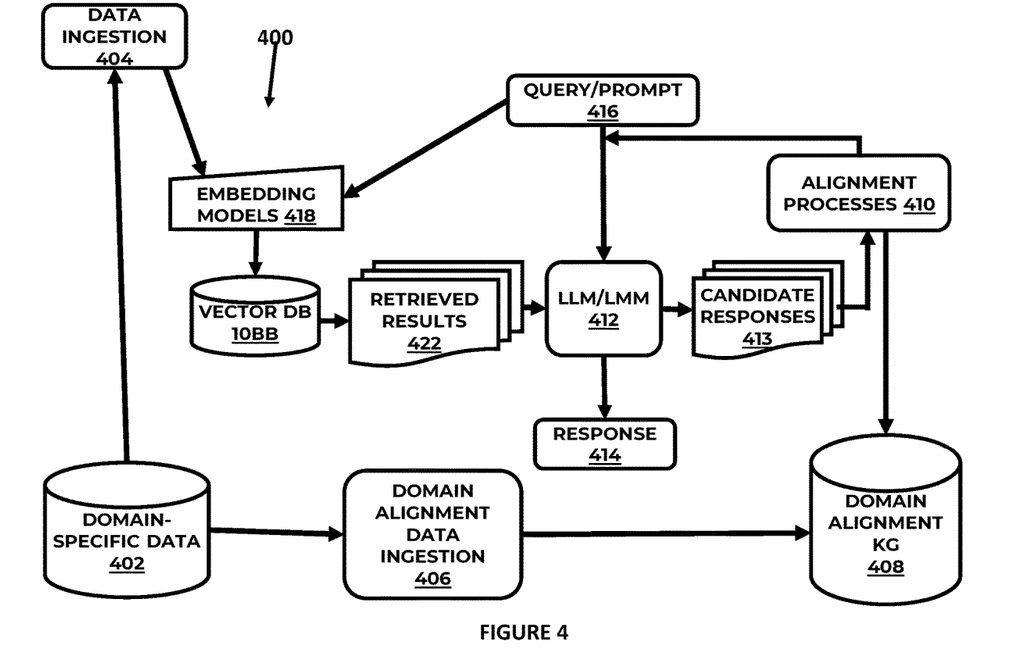
FIG. 4 illustrates a method and data flow for post-training an LLM or LMM to be aligned with domain specific principles.

In an embodiment in which a third party LLM/LMM is post-trained for alignment, the user may, using APIs, submit a prompt to the LLM/LMM as shown in FIG. 4 and the results of the response to the prompt are adjusted to be aligned to the domain specific principles. The results, adjusted to the domain specific principles and thus aligned to those domain specific principles, are then returned to the user so that the user benefits from the LLM/LMM aligned to the domain specific principles as will be discussed in more detail below with reference to FIG. 4.

The below disclosed system and method post-trains (see FIG. 4) or fine tunes the training (see FIGS. 2-3) of an LLM/LMM (system LLM/LMM or third party LLM/LMM) so that the LLM/LMM is aligned with one or more principles for specific domains and that is able to generate content that is based on the principles of the domain. For example, in the case of the LLM/LMM aligned with journalistic principles, the LLM/LMM is able to detect and reason around the reliability, bias and violations of journalistic integrity found in the corpus of documents. In one implementation, the LLM/LMM may be trained with specific instructions that are crafted by trained experts in the particular domain to ensure the alignment with the principles of the specific domain. The aligned LLM/LMM, when aligned with journalistic principles, may use a massive training set of scored news articles with ratings on clickbait, exaggeration, subjectivity, source quality, dog whistle detection, political bias scored using the system's algorithms and scoring technology. The aligned LLM/LMM also may use Reinforcement Learning with Human in the Loop (RLHL) techniques to guide the LLM/LMM towards producing content that is aligned with particular domain principles. The aligned LLM/LMM system and method may have prompt instructions that carefully explain inputs and outputs that align with the specific domain.

As shown in FIG. 1, the system 100 allows a plurality of users to interact with the system 100 over the network 104. Each computing device 102 is a processing unit based device with inputs/outputs (one or more of a touchscreen, keyboard, mouse, display, etc.,) and circuits for communicating over the network 104 with the backend 106. The user may interact using a browser application executed by the processor of the computing device 102 or using a mobile application or downloaded application that is also executed by the processor of the computing device 102. For example, each computing device 102 may be a laptop computer 102A, a tablet computer 102B, a personal computer 102C, . . . , and/or a phone or smartphone device 102N, such as a Apple® iPhone® or a Google® Android® operating system based device.

The network 104 may use a communications protocol (TCP/IP) and a data transfer protocol (such as HTTP or HTTPS) or a yet to be developed communications and data transfer protocol to allow each computing device 102 and the backend system to connect to each other and communicate with each other. The network 104 may comprising one or more wired or wireless communication paths including Ethernet, a digital data network, a cellular data network, a cellular network, a WAN, a LAN, a backhaul network and the like.

The backend system 106 may be one or more computing resources including memory and processors that train and operate the trained LLM/LMM 106A or post-train an LLM/LMM and execute the user interface engine 106C. For example, the one or more computing resources may be cloud computing resources from Amazon AWS or Microsoft Azure, a server computer, an application computer and the like. In addition to the LLLM/LMM 106A and the user interface module 106C, the backend 196 may further comprise a training module 106B that post-trains or fine tunes the training on an LLM/LMM to align it with the principles of a specific domain (as discussed in more detail below with reference to FIGS. 2-4) and a content scoring system 106D that performs quality scoring on each piece of content that may be used by the system to align the LLM/LMM to domain specific principles as discussed below. In one embodiment, the trained LLM 106A, the training module 106B, the user interface engine 106C and the content scoring system 106D may each be a plurality of lines of computer code/instructions executed by a processor of the backend computer system 106 that implement the processes of those systems wherein the processor is configured to perform those processes as discussed below. The backend system 106 may be coupled to one or more data stores 108A, . . . , 108N that store the instructions/computer code for the LLM/LMM 106A and the user interface engine 106C, the corpus of data used to train the LLM/LMM 106A and various other data used by the system. In one implementation, one or more of the data stores may be known vector databases 108B that store embeddings associated with the LLM as described below.

In one implementation, the trained LLM/LMM 106A aligned with domain specific principles may be an LLM/LMM such as a Language Representation Model, such as GPT (Generative Pre-trained Transformer) models, BERT (Bidirectional Encoder Representations from Transformers), and RoBERTa, a Zero-shot Model, such as GPT-3, a Multimodal Model, such as OpenAI's CLIP and/or a Fine-tuned or Domain-specific Models. Examples of current unaligned LLMs may include GPT launched by Open AI, Pathways Language Model (PaLM) developed by Google AI or PaLM 2 LLM that is currently being used for Google's latest version of Google Bard, XLNet that is an autoregressive Transformer that combines the bidirectional capability of BERT and the autoregressive technology of Transformer-XL to improve the language modeling task, BERT (Bidirectional Encoder Representations from Transformers) which is a deep learning-based technique for NLP developed by Google Brain or LlaMA (Large Language Model Meta AI) launched by Meta.

For an LLM/LMM aligned with journalistic principles, the LLM/LMM 106A may be pre-trained on a large corpus of text or fine-tuned on news articles. For example, the LLM/LMM 106A may be pre-trained on a set of input/output instructions and definitions of journalistic principles for each of the principles described below. The journalistic principles are used to pre-train the LLM in order to detect instances of these in the content but also to be able to generate content that respects these journalistic principles. For example, the journalistic principles may include one or more of: clickbait, subjectivity including hyper partisan, quality of sources with on/Off background source attribution and/or on/Off record source attribution, ad hominem and personal attacks including abusive ad hominem including obscene language, hate speech, circumstantial ad hominem and tuQuoque Ad hominem, red herring and dog whistles. Each of these journalistic principles are well known in the journalistic industry and well understood. Each of these journalistic principles represent content that is antithetical to the journalistic principles and ethics and ideally should be removed from a response that is provided by the LLM/LMM 106A.

The backend 106 and the system (that includes the trained and aligned LLM/LMM 106A) may include the content scoring system and content scoring 106D (further details of which are disclosed in co-pending and commonly owned U.S. patent application Ser. No. 18/220,437 filed Jul. 11, 2023 that is incorporated herein by reference). The scoring engine 106D may gather pieces of content, such as news pieces of content, from a corpus 300, such as the Internet, with the objective to be able to assess the quality and/or political lean of each piece of content in a programmatic manner by using a set of document quality detectors broken down as a set each for a different journalistic principle. The content scorer may also detect political bias of the article, use domain expertise (trained data journalist(s)) to teach the system how to score the pieces of content and then use principles from machine teaching, where experts interact with the model, correct its mistakes, iterate so that the machine learning model(s) used to score the pieces of content learns and become better at accurate scoring each piece of content.

The scoring engine 106D and models therein are designed to emulate the process of a highly trained journalist. The models may be trained on proprietary datasets curated by expert journalists and linguists and utilize vector representations yielded by language models. In one implementation, the one or more models may be transformer-based architectures and recurrent long-short term memory neural networks that utilize custom attention mechanisms. Attention mechanisms are used to carefully compare the title with the content of the article and detect violations of journalistic principles like clickbait, subjectivity, ad hominem, attacks, quality and type of the sources cited in the article, just as a human expert would do. The one or more models may use different extractive summarization algorithms to enable assessing the degree of relevance of detected violations to the main content of the article and inform the scoring. The one or more models may use a stance detection algorithms to evaluate the stance towards an individual or a topic. Some models may be applied at the sentence level, where a vector representation of each sentence is passed through a neural network model that produces a probability of a violation for that sentence. The sentence level score are collected over all sentences and use different known aggregation algorithms to produce a score over the whole article. The degree of violation of each journalistic principle is used to give a quality score to each article. In one implementation, the final overall scoring model may be a tree-ensemble architecture trained on set of teaching scenarios curated by journalists. The tree-model has learned from the teaching scenarios to adapt to the non-linear dependencies that may exist in news content. For example, subjectivity is expected in certain article types like Op-eds. On the other hand, subjectivity should be penalized heavily in breaking news articles that are straight reporting. Thus, for an LLM/LMM aligned to journalistic principles, the scores of the scoring engine may be used to align the LLM/LMM to the journalistic principles.

Figure 2:
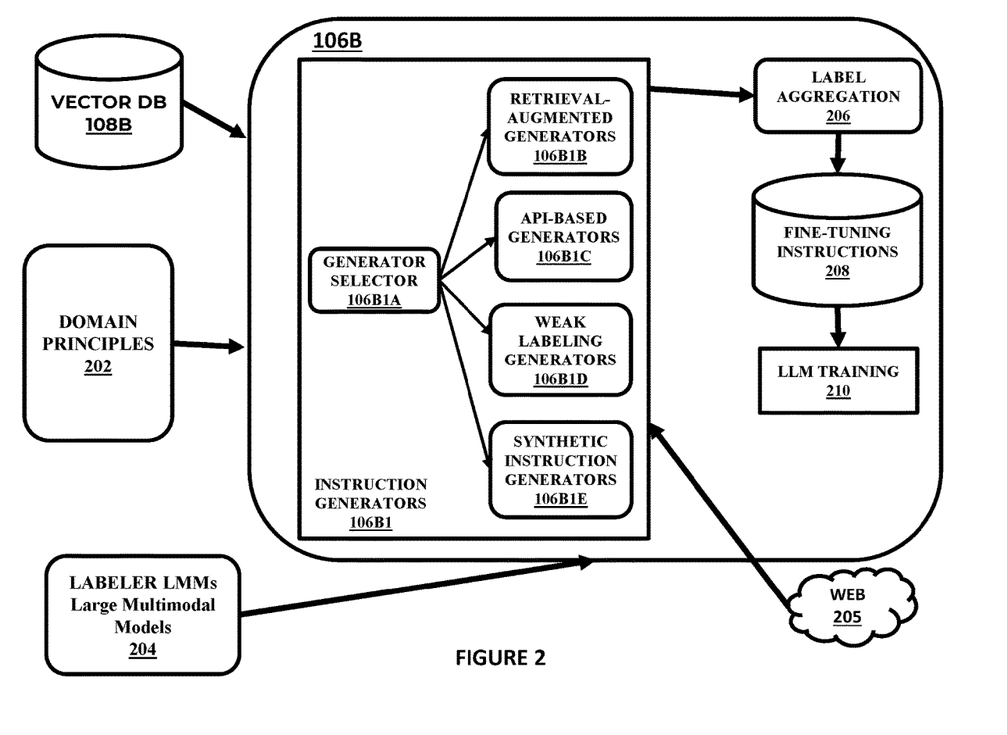
FIG. 2 illustrates more details of a training module 106B of the system in FIG. 1 that can post-train or fine tune the training of an LLM or LMM to align with different one or more domain specific principles.

FIG. 2 illustrates more details of a training module 106B of the system in FIG. 1 that can post-train or fine tune the training of an LLM or LMM to align with different one or more domain specific principles. Each of the modules/elements/engines/devices shown in FIG. 2 may be preferably implemented with a plurality of lines of instructions/computer code executed by a processor of the backend 106 so that the processor of the backend 106 may be configured to perform the operations and processes of the training module 106B. Each of the modules/elements/engines/devices shown in FIG. 2 also may be implemented in hardware with devices that have a processor executes that plurality of lines of instructions/computer code to perform the operations/processes described below.

The training module 106B may receive inputs from the vector database 108B, a store of domain principles 202, the web 205 and labeler LLMs or LMMS 204 wherein each input may be used to generate instructions for the LLM/LMM training aligned to the domain specific principles. The vector db 108B may contain vector representation of domain principles and may have one or multiple vectors for each principle in addition to vectors for grounding datapoints, each datapoint representing each principle. The store of domain principles 202 may include structured data (json files, RDF format, relational DBs, etc.) and/or unstructured data, such as a task description, a narrative, PDF files, etc., In one embodiment, the domain principles store 202 may have a plurality of domain principle files (one file for each domain and its principles) wherein each domain principle file is a file describing the principles of the domain and the format of the file may be structured or unstructured.

The training module 106B may have an instruction generator 106B1 that selects and generates instructions for domain specific principles that are used to fine tune the training of the LLM/LMM so that the LLM/LMM is aligned with the domain specific principles or multiple sets of different domain specific principles. The instruction generator 106B1 may further include a generator selector 106B1A, one or more retrieval-augmented generator(s) (RAGs) 106B1B, one or more API-based generator(s) 106B1C, one or more weak labeling generator(s) 106B1D and one or more synthetic instructions generator(s) 106B1E. The generator selector 106B1A may be implemented as a trained machine learning multilabel classification system capable of selecting a subset (one or more) of the instruction generators 106B1B-E. The input to the generator selector 106B1A may be the domain principles 202 and the output is a subset of the appropriate instruction generators that are used to generate the instructions/prompts used to train the LLM/LMM to be aligned with the domain specific principles.

For example, for the GARM domain principles (example above and principles in Appendix A that is incorporated herein by reference), the generators that are selected may be: 1. Weak labeling generators: generate labeling functions, each checking for a GARM violation and assessing the risk for that violation; 2. Retrieval Augmented Generation (RAG) generator to gather unlabeled data from the web; and 3. Synthetic instruction generator to produce synthetic instructions. For the GARM domain, the weak labeling functions in 1 are used to label the data in 2 and are finally combined with 3 to create a final set of instructions.

Retrieval-Augmented Generator

The retrieval-augmented generators 106B1B may be a search-based system with access to live data on the web 205. The system may include a query generator, a retriever, a ranker, a parser and an instruction generator. The query generator receives, as input, the domain principles and generates one or more web queries. The retriever takes as input the web queries and returns a number of web results relevant to each of the web queries. The ranker ranks the results with respect to their relevance to each of the web queries. The parser then parses the ranked results that may be in html format, to find information that answers each of the web queries. The information is then given to the instruction generator to generate instructions to be used downstream for the fine-tuning of the LLM or LMM.

For example, using the above already described agriculture example, an retrieval-augmented generator may start with a set of PDFs or e-books on agriculture and the query generator may produce a bunch of questions/queries based on key points of chapters, summaries, tables, graphs etc. within the set of PDFs or ebooks, examples of which are shown in the Table below.

| Topic | Queries |
| --- | --- |
| Sustainable Agriculture Practices | What are sustainable agriculture practices and explain how they contribute to environmental conservation? |
| Agricultural Economics | How does the economic viability of organic farming versus conventional farming in a given region compare to each other? |
| Crop and Soil Sciences | What is the role of soil microbiome in crop health and yield. How can farmers enhance soil microbiome diversity? |
| Technology Applications in Agriculture | How can precision agriculture technologies contribute to more efficient water usage in farming? |

The retriever of the retrieval-augmentation generator may retrieve a set of enhanced results from the web and the ranker ranks these results with respect to their relevance to each query. A parser of the retrieval-augmentation generator may parse the html and creates text chunks for each retrieved document and it then filters text chunks that are relevant answers to each query. The pairs of queries and answers are used as instructions to the fine-tuning of a domain-specific LLM using the retrieval augmentation generator.

API-Based Generator

The API-based generators 106B1C may be an API-based system with access to knowledge bases, question and answer API's, calculator APIs, calendar APIs and other such APIs wherein the APIs may be owned by a third-party or owned by the system. The API-based system involves a query generator and an instruction generator. The query generator takes, as input, the domain principles and creates requests for the appropriate APIs. The format of the request may be json, avro, grpc or any other format that is supported by the client API. Using the same agriculture example above, the API based generator, instead of retrieving documents/answers from the web, the queries are sent directly to a Question and Answer API. The pairs of queries and answers as returned by the Question and Answer API and are used as instructions to the fine-tuning of the domain-specific LLM.

Weak Labeling Generator

The weak labeling generators 106B1D may be a code generating system, capable of generating a set of labeling functions wherein each labeling function is responsible for performing a simple task. The input is a set of domain rules and a collection of unlabeled datapoints that are supplied to the system. The system will internally process each rule and will convert it to a labeling function. An example of a labeling function responsible for detecting whether specific text contains mentions of illegal drugs in the python programming language is the below:

def detect_illegal_drugs text:
        drug_keywords=['cocaine', 'weed', 'heroine']
        text=text.lower ( )
        for keyword in drug_keywords:
            if keyword in text:
                return True # detected
        return False # Not detected Each generated labeling function is the then applied to the unlabeled data to produce an instruction to be used for model training downstream. A simple example of this weak labeling generator is shown in the below table.

| Generated Input | Generated labeling function | Output |
| --- | --- | --- |
| While there is growing evidence supporting the effectiveness of medical marijuana in treating certain conditions, there are also risks associated with its use. Medical marijuana is a psychoactive drug that can cause cognitive and psychological effects, particularly when used in high doses or when mixed with other substances. Additionally, medical marijuana can interact with other medications, potentially altering their effectiveness or causing adverse reactions. Despite these risks, medical marijuana can also provide significant benefits for certain conditions, such as chronic pain, nausea and vomiting associated with chemotherapy, and seizure disorders. | def detect_illegal_drugs text: ... drug_keywords = ['cocaine', 'weed', 'heroine', 'marijuana'] text = text.lower( ) for keyword in drug_keywords: if keyword in text: return True # detected return False # Not detected | True for Illegal Drugs |
| These Jews, they are nothing but a bunch of greedy, selfish, money hungry people who care nothing for anyone but themselves. They will do and say anything to get ahead, and they don't care who they step on or hurt in the process. They are the worst kind of people, and I can't believe that we're still letting them into our country and giving them special privileges. | def detect_hate_speech text: ... hs_keywords = ['jew', 'niger', 'beaner'] text = text.lower( ) for keyword in hs_keywords: if keyword in text: return True # detected return False # Not detected | True for Hate-speech |

Synthetic Instruction Generator

The synthetic instruction generators 106B1E are well known and discussed later in this disclosure. Using one or more of these instructions generators, a set of instructions are generated designed to align the LLM/LMM with the domain specific principles.

The training module 106B may output these set of instructions and have a label aggregator 206 that is a system responsible for taken all outputs from the instruction generators and their outputs and aggregating their responses into a single output. This label aggregation process involves identifying duplicate instructions (from the two or more selected different instructions generators for any particular domain specific principle) that may be associated with different outputs and assigning a single output. The algorithmic process to aggregate the results of aggregators into a single output may involve defining a generative model for how the aggregators generate their labels based on parameters that describe their accuracies and correlations. The parameters of this generative model are then estimated using methods like expectation-maximization (EM) or gradient-based optimization techniques, with or without regularization to prevent overfitting. For example, if there is a dataset consisting of heights and weights of individuals and it is desirable to model this dataset using a GMM to identify clusters corresponding to different body types, the method may use an EM or gradient-based optimization to estimate the parameters of the Gaussian components (mean heights and weights, variances, and covariances) while possibly applying regularization techniques to ensure the model generalizes well and does not overfit the data.

The output from the label aggregator (a set of instructions for the domain specific principles with duplicates removed) may be fed into an instructions fine tuning database 208. The instructions fine tuning database 208 may contain a set of instructions for various different domain specific principles so that an LLM/LMM can be trained using any one or more of the sets of fine tuned instructions to align the LLM/LMM to one or more domain specific principles. A training process 210 may train the LLM/LMM using the one or more sets of fine tuned instructions to produce the LLM/LMM aligned to the domain specific principles and thus generate more appropriate responses to a query of a user as discussed above for the GARM, civility and agriculture domains. In this embodiment shown in FIG. 2, the LLM/LMM is fine tuned for the domain specific principles.

Figure 3:
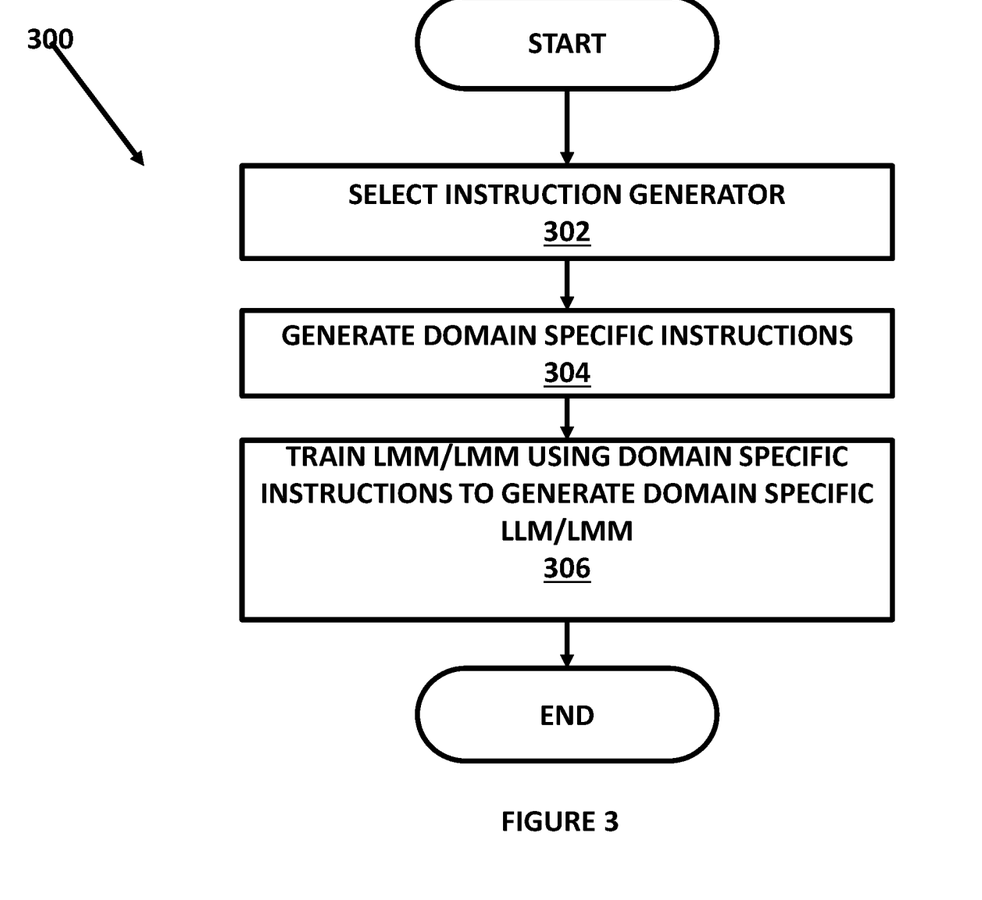
FIG. 3 illustrates a method for fine tuning the training of an LLM or LMM.

FIG. 3 illustrates a method 300 for fine tuning the training of an LLM or LMM that may be performed by the system shown in FIGS. 1-2, but may also be performed by another system that has a plurality of lines of computer code/instructions executed by the processor so that the processor is configured to perform the fine tuning of the LLM/LMM and align the LLM/LMM to the principles of the specific domain. In the method, one or more instructions generators are selected (302) wherein those one or more instructions generators each generate a set of instructions that fine tune the LLM/LMM as discussed above. Based on all of the instructions generated by the one or more instruction generators, the method generates a final set of domain principle specific instructions (304) that may be used to train the LLM/LMM (306).

FIG. 4 illustrates a method 400 and data flow for post-training an LLM or LMM to be aligned with domain specific principles. In this alternative embodiment, an already trained LLM/LMM 412 may be post trained to align to domain specific principles wherein that LLM/LMM 412 may be owned by a third party of the system. With this post-training process, the same already training LLM/LMM 412 may have its responses adjusted based on the domain specific principles to which the LLM/LMM 412 is supposed to be aligned. For example, for a prompt from a first user, the LLM/LMM 412 may be post-trained to be aligned the GARM domain principles so that the response to the first user is aligned with the GARM principles. Then, shortly after, a second user may submit a query that requires the LLM/LMM 412 to be aligned with the agriculture domain and, using the post training method 400 shown in FIG. 4, the LLM/LMM 412 responses may be adjusted based on the agriculture domain. Thus, in this embodiment, a single already trained LLM/LMM 412 may be re-aligned to different domain specific principles. Note that the method 400 in FIG. 4 may be performed using the system in FIGS. 1-2 although some aspects will be different in this embodiment or may be performed by other systems. Furthermore, each of the processes shown in FIG. 4 may be preferably performed by a processor that executes a plurality of lines of instructions/computer code so that the processor is configured to perform each of the method processes. In FIG. 4, each of the data repositories may be a hardware, software or hardware/software implemented storage for the data, such as a known vector database in one implementation.

The system that implements the method may have a set of domain specific data 402 that may be retrieved and ingested (404). This domain specific data may be similar to the data discussed above with reference to FIG. 2. In one implementation, the domain specific data may be a massive set of news articles that may be rated/scored on clickbait, exaggeration, subjectivity, source quality, dog whistle detection and/or political bias (such as by using the scoring/rating techniques disclosed in co-pending and commonly owned U.S. patent application Ser. No. 18/220,437 filed Jul. 11, 2023 (that is incorporated herein by reference) and that massive set of scored/rated content may be used to post-train an LLM/LMM for the journalistic domain principles. Each different domain may store a different set of domain specific data 402 so that the GARM domain may have its set of domain specific data, while the civility domain or the agriculture domain may each have their own domain specific data. Each set of domain specific data may be used to align the already trained LLM/LMM 412 to be aligned with the principles of the particular domain relevant to the query from a user. The domain specific data 402 may be ingested (by domain alignment data ingestion 406) to generate a domain alignment knowledge graph (KG) 408. The KG may be used to verify, as discussed below, that the LLM/LMM 412 is in alignment with the principles of the specific domain that may be determined based on the query posed by the user or may be specified by the user.

The data in the domain alignment KG (408) may be used by a set of alignment processes 410 to train those alignment processes to be able to adjust a set of candidate responses 413 from the already trained LLM/LMM 412 to generate a response 414 from the already trained LLM/LMM 412 that is aligned with the principles of the particular domain.

In this method 400, the already trained LLM/LMM 412 may use the vector db 106B, embedding models 418 and retrieved results 422 from the vector db 106B to generate the one or more candidate responses 413 that are likely not aligned to the principles of the specific domain. Thus, the data ingestion process 204 receives the domain specific data and feeds that data into the set of embedding models 218. Each embedding is a representation of values or objects, such as text, images, and audio, that are designed to be consumed by machine learning models/LLMs and translate objects like these into a mathematical form according to the factors or traits each one may or may not have, and the categories they belong to. Thus, the embeddings allows the LLM to find similar objects based on the mathematical form. For example, given a photo or a document, a machine learning model that uses embeddings could find a similar photo or document. Each generated embedding may be stored in the vector db 108B. When a user submits a query/prompt 416, the embeddings are used to search the database 108B for a set of retrieved results 422 that are sent to the LLM/LMM 412 that may then generate the set of candidate responses 413 that are analyzed by the set of alignment processes 410.

Each alignment process 410 may perform lookups against knowledge graphs of facts and reranking of candidate LLM responses. In one embodiment, the alignment processes 410 may involve synthetic instruction generation using in-depth or in-breadth instruction generation techniques. The techniques may include Retrieval Augmented Generation (RAG) techniques where the training instructions are produced by crawling the web and obtaining live data. Use of external tools and APIs, such as calculators, question and answering systems, and Wikipedia searches. Data programming techniques, where a collection of weak labeling functions in the form of computer code, each representing a specific rule or principle of the domain and used to label unlabeled data points. Weak labeling functions should not necessarily be human-generated, they could be generated by another LLM, which has been fined-tuned for the specific task of weak label generation. The instruction generators discussed above may also be used. For the post-training embodiment shown in FIG. 4, the alignment processes may generate the various instructions as described above and then be fed into the already trained LLM/LMM 412 to adjust the final response 414 to the user query so that the final response 414 is aligned with the principles of the specific domain. Using the process 400 in FIG. 4, even an already trained LLM/LMM 412 may be fine tuned to generate responses that are aligned to the principles of the specific domain. In some embodiments, the same selection of the instructions generators and aggregation of the labels from the instructions generators as disclosed in FIG. 2 may be used in the post-training process shown in FIG. 4. In this post-training embodiment, the already trained LLM/LMM may be supplementally trained/retrained using the set of generated instructions so that the already trained LLM/LMM becomes aligned with the principles of the specific domain pertinent to the query of the user. Thus, the already trained LMM/LLM is retrained using the generated instructions. Once the already trained LLM/LMM is aligned with the principles of the specific one or more domains, it will then be an LLM/LMM, for a future user query, that is already aligned to the principles of the specific one or more domains.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for generating responses aligned with domain-specific principles, the method comprising:
receiving, by a computer having a trained artificial intelligence model being one of a large language model and a large multimodal model, a prompt from a user of a computing device for a response from the artificial intelligence model;
aligning each response from the trained artificial intelligence model with one or more principles for a particular domain, wherein aligning each response further comprises performing one or more alignment processes for the particular domain to post train the trained artificial intelligence model and generate an aligned response that is aligned with the one or more principles for the particular domain and wherein performing the one or more alignment processes further comprises selecting one or more instruction generators for the particular domain, generating a plurality of instructions aligned with the one or more principles for the particular domain from all of the one or more instructions generators, aggregating the plurality of instructions into a final plurality of instructions aligned with the one or more principles for the particular domain, post-training the trained artificial intelligence model using the final plurality of instructions aligned with one or more principles of the particular domain and generating the aligned response to the prompt from the user; and
returning, to the computing device, the aligned response in response to the prompt of the user.

2. The method of claim 1 further comprising training the artificial intelligence model with the plurality of instructions so that the artificial intelligence model is aligned with the one or more principles for the particular domain.

3. The method of claim 2, wherein training the artificial intelligence model further comprises selecting, by a training module of the computer, one or more instruction generators for each of a plurality of domains, generating a plurality of instructions from each of the selected one or more instructions generators for each of the plurality of domains, wherein each plurality of generated instruction is aligned with each of the domains and training a plurality of artificial intelligence models using the plurality of generated instructions so that each artificial intelligence model is aligned with the plurality of domains.

4. The method of claim 1, wherein aggregating the plurality of generated instructions further comprises removing duplicate instructions from the plurality of generated instructions.

5. The method of claim 3, wherein training the artificial intelligence model further comprises aggregating the plurality of generated instructions to remove duplicate instructions.

6. The method of claim 3, wherein selecting the one or more instruction generators further comprises selecting one or more of a retrieval augmented generator, an API-based generator, a weak labeling generator and a synthetic instruction generator.

7. The method of claim 1, wherein selecting the one or more instruction generators further comprises selecting one or more of a retrieval augmented generator, an API-based generator, a weak labeling generator and a synthetic instruction generator.

8. The method of claim 1, wherein performing one or more alignment processes further comprises performing one or more of a retrieval augmented instruction process, an API-based instruction process, a weak labeling instruction process and a synthetic instruction process.

9. A system, comprising:
a computer system having a processor;
a plurality of lines of instructions that are executed by the processor, the processor being configured to:
receive, by a computer having the artificial intelligence model being one of a large language model and a large multimodal model from a computing device, a prompt from a user of a computing device for a response from the artificial intelligence model;
align each response from the trained artificial intelligence model with one or more principles for a particular domain, wherein the processor configured to align each response is further configured to perform one or more alignment processes for the particular domain to post train the trained artificial intelligence model and generate an aligned response that is aligned with the one or more principles for the particular domain, select one or more instruction generators for the particular domain, generate a plurality of instructions aligned with the one or more principles for the particular domain from all of the one or more instructions generators, aggregate the plurality of instructions into a final plurality of instructions aligned with the one or more principles for the particular domain, post-train the trained artificial intelligence model using the final plurality of instructions aligned with the one or more principles of the particular domain and generate the aligned response to the prompt from the user; and
return, to the computing device, the aligned response to the prompt of the user.

10. The system of claim 9, wherein the processor is further configured to train the artificial intelligence model with the plurality of instructions so that the artificial intelligence model is aligned with the one or more principles for the particular domain.

11. The system of claim 10, wherein the processor configured to train the artificial intelligence model is further configured to select, by a training module of the computer, one or more instruction generators for each of a plurality of domains, generate a plurality of instructions from all of the one or more instructions generators for each of the plurality of domains, wherein each plurality of generated instruction is aligned with each of the domains and train a plurality of artificial intelligence models using the plurality of generated instructions so that each artificial intelligence model is aligned with the plurality of domains.

12. The system of claim 9, wherein the processor is further configured to remove duplicate instructions.

13. The system of claim 11, wherein the processor configured to train the artificial intelligence model is further configured to aggregate the plurality of generated instructions to remove duplicate instructions.

14. The system of claim 11, wherein the processor configured to select the one or more instruction generators is further configured to select one or more of a retrieval augmented generator, an API-based generator, a weak labeling generator and a synthetic instruction generator.

15. The system of claim 9, wherein the processor configured to select the one or more instruction generators is further configured to select one or more of a retrieval augmented generator, an API-based generator, a weak labeling generator and a synthetic instruction generator.

16. The system of claim 9, wherein the processor configured to perform the one or more alignment processes is further configured to perform one or more of a retrieval augmented instruction process, an API-based instruction process, a weak labeling instruction process and a synthetic instruction process.

17. The system of claim 9, wherein the processor configured to perform the one or more alignment processes is further configured to select one or more instruction generators for each of a plurality of domains, generate plurality of instructions from all of the one or more instructions generators for each of the plurality of domains, wherein each plurality of generated instruction is aligned with each of the domains and supplementally training the already training artificial intelligence model using the plurality of generated instructions so that the already trained artificial intelligence model is aligned with the one of the plurality of domains to generate the aligned response.

* * * * *